United States Patent Office 3,386,365
Patented June 4, 1968

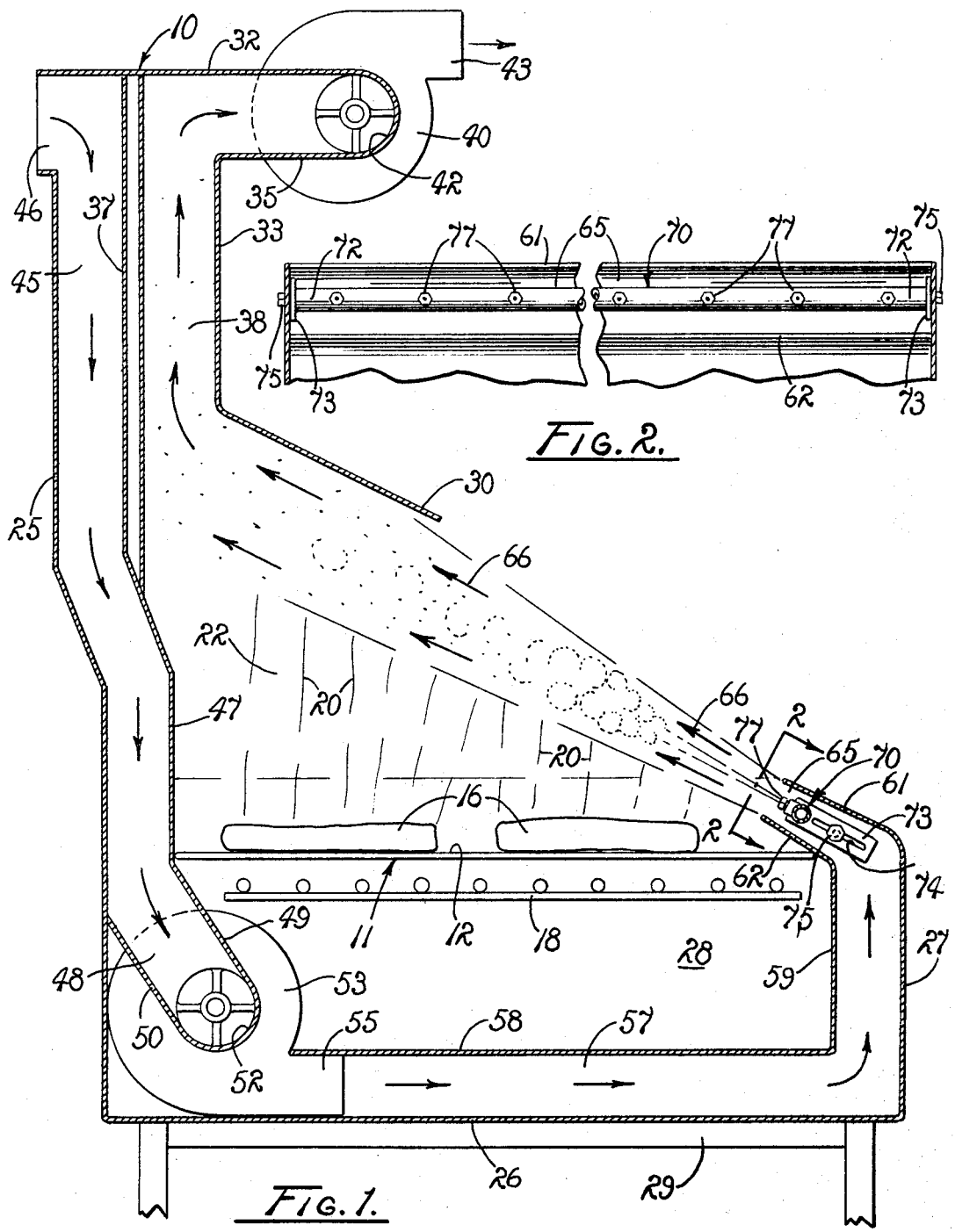

3,386,365
APPARATUS AND METHOD FOR PRODUCING
A FOG CURTAIN HEAT SHIELD
Donald D. Jensen, 1141 Park Circle Drive,
Fresno, Calif. 93702
Filed Jan. 16, 1967, Ser. No. 609,582
7 Claims. (Cl. 98—36)

ABSTRACT OF THE DISCLOSURE

A system for confining heat to a localized area from which such heat tends to emanate by radiation and convection, which system provides an elongated orifice to project a curtain of air as a heat barrier across the localized area. A plurality of adjustable nozzles are disposed within the orifice and disperse a spray of water droplets into the airstream to produce an uninterrupted shroud of fog which serves as a reflective and heat absorbing barrier against the passage of convectional and radiant heat to minimize or preclude heating and polluting the surrounding atmosphere.

CROSS REFERENCES TO RELATED APPLICATIONS

The present invention relates to the same general subject matter but incorporates substantial modifications over my issued Patent Nos. 3,260,189 and 3,292,525.

BACKGROUND OF THE INVENTION

(1) Field of the invention

The present invention relates to the general field of ventilation equipment for particular use in connection with commercial cooking ranges and the like. Such ventilation equipment is utilized to remove the products of combustion and volatilization which are emanated from the cooking surface of such ranges to preclude the contamination of the surrounding atmosphere.

(2) Description of the prior art

My above designated prior patents were primarily directed to providing systems and methods for providing an air curtain over the cooking surface of a cooking range or the like to entrain the gaseous liquid and solid contaminants coming from the cooking surface. In Patent No. 3,260,189 closed air systems were provided in which the air was continuously recirculated over the cooking surface in a continuous air curtain saturated with water vapor more readily to entrain such contaminants therein. Various filtering and refrigerating devices were employed to condense the contaminants from the airstream for subsequent recirculation of clean air over the cooking surface. Patent No. 3,292,525 discloses a non-circulating air system which continuously discharges a stream of fresh air over a cooking surface and discharges the contaminated air to the atmosphere outwardly from the room in which the cooking range is located. These systems, however, were not particularly concerned with blocking the passage of the radiant infrared heat from the range into the room. The present invention constitutes a further refinement over these prior systems and methods by providing a non-circulating air system for continually discharging fresh air in a stream over the cooking area and by introducing into the airstream a spray of water droplets of a size initially to provide a reflective barrier against the passage of convectional and radiant heat through the airstream, which droplets are subsequently vaporized during their movement across the cooking surface to provide an additional refrigerating effect and to enhance the contaminant absorbing capabilities of the airstream prior to the discharge outwardly from the room in which the cooking range is located.

SUMMARY

The present invention is particularly directed to a system for producing a water droplet fog curtain heat shield over the cooking surface of a cooking range or the like to preclude the escape of contaminants and heat currents into the room in which the range is located. The system provides a housing enclosing the range and supporting the cooking surface which has a centrifugal blower to provide a continuous predetermined volume of fresh air to an elongated discharge slot or orifice disposed adjacent to and coextensive with the cooking surface. The orifice is disposed so as to direct a continuous stream of air over the cooking surface at a predetermined volume to entrain therein such products of combustion and volatilization that emanate from the cooking surface. A second blower is mounted in an exhaust hood above the cooking surface to receive and to discharge the contaminant entrained stream of air outwardly from the room in which the cooking range is located. A plurality of nozzles are mounted upon a common manifold within the air discharge orifice with the manifold connected to a source of water under pressure. The nozzles are sized to disperse a spray of water droplets into the airstream at a velocity approximately the same as the velocity of the airstream for simultaneous movement therewith over the cooking surface. Accordingly, the contaminants are entrained within the airstream while the water droplets initially provide a reflective heat absorbing barrier against the passage of convectional and radiant heat, with the droplets being subsequently vaporized to have a refrigerating effect in the airstream above the cooking surface.

It is therefore an object of the present invention to provide an apparatus and method which is effective to remove contaminants from a localized zone such as a cooking surface or the like and to shield the surrounding atmosphere from the passage of convectional and radiant heat from such cooking surface or other source of contaminants.

Another object is to provide such an apparatus and method which are capable of producing a refrigerating effect to balance and to neutralize such heat currents above the cooking surface.

Another object is to provide such an apparatus and method which are capable of producing such an effective heat shield over a cooking surface without appreciably raising the humidity of the surrounding atmosphere.

Another object is to provide such an apparatus and method which are capable of regulating the heat reflecting and absorbing capacity of the system in corresponding relation to the amount of heat generated by the cooking surface.

Another object is to provide an apparatus and method which are capable of discharging a stream of air in a continuous curtain over the cooking surface and having a spray of water droplets dispersed therein to provide a reflective heat absorbing barrier against the passage of heat currents therethrough.

BRIEF DESCRIPTION OF THE DRAWING

FIG. 1 is a central vertical section through a cooking range embodying the principles of the present invention.

FIG. 2 is a fragmentary substantially vertical section through the apparatus taken generally along the line 2—2 of FIG. 1 showing an elongated air discharge orifice in which is mounted a plurality of water spray nozzles.

DESCRIPTION OF THE PREFERRED EMBODIMENT

Referring more particularly to the drawings, a cooking range which has a housing generally indicated by the reference numeral 10 operatively supports a grill 11 presenting an upwardly disposed cooking surface 12. The cooking surface is adapted to support articles of food to be cooked which are indicated by the reference numeral 16. The cooking surface is heated by a burner 18 or other source of heat disposed immediately below the grill for transferring thermal energy to the grill to elevate the temperature of the cooking surface and the food articles disposed thereon.

As is well known, the various cooking oils employed during the cooking operation as well as the fats and other materials in the food generate smoke and fumes in which are entrained gas vapors, water vapors and other undesirable and annoying contaminants. Furthermore, the cooking surface 12 is the source of convectional heat currents and radiant heat which, along with the above described cooking fumes, are a plurality of wavy lines indicated at 20. The smoke and heat fumes are generated in a substantially localized zone 22 above the cooking surface which is generally defined and restricted by the marginal edges of the grill 11.

The housing 10 of the cooking range provides an outer back wall 25, a continuous bottom wall 26, a front wall 27, and opposite side walls 28. The housing is supported in predetermined elevationally spaced relation to a floor surface, not shown, by a support frame and leg assembly which is fragmentarily indicated by the reference numeral 29. An exhaust hood 30 is supported generally over the grill 11 and the zone 22 above the convectional and radiant heat currents and fumes 20. The hood is supported from a top wall 32 of the housing and includes a substantially upright portion 33 disposed in spaced substantially parallel relation to the back wall 25.

The hood 30 further includes a substantially horizontal portion 35 continuous with the upright portion 33 and is disposed in spaced substantially parallel relation to the top wall 32. A dual panel partition 37 is positioned within the housing intermediate the back wall 25 and the upright portion 33 of the hood to define an exhaust passage 38 upwardly and thence horizontally extended between the top wall and the horizontal portion of the hood. A centrifugal exhaust blower 40 is mounted on the top wall and has an inlet or suction opening 42 connected with the exhaust passage 38. The blower has an exhaust outlet tube 43 extended therefrom which is connected with any suitable conduit, not shown, for porting the exhaust outlet from the blower outwardly from the room in which the cooking range is located.

An elongated fresh air inlet passage 45 is formed between the partition 37 and the back wall 25 of the housing. The inlet passage is connected with a source of fresh air externally of the room in which the cooking range is located through an inlet air opening 46 in the back wall adjacent to the top wall of the housing. The dual partition wall 37 terminates at a predetermined point above the cooking surface 12 and below the hood 30 with the rearwardmost panel thereof extended downwardly adjacent to the cooking surface 12 to provide a single panel lower wall 47 which is disposed in spaced substantially parallel relation to the back wall. It is noted that the dual partition wall 37 provides a dead air space between the panels thereof so as to minimize transfer of thermal energy between the exhaust passage 38 and the inlet air passage 45.

The air inlet passage 45 provides a lower portion 48 which is formed by a pair of spaced inner walls 49 and 50, respectively, inwardly extended from the lower wall of the partition 37 and the backwall of the housing. The lower portion of the air inlet passage is connected to the inlet opening 52 of a centrifugal inlet air blower 53 mounted in the housing beneath the grill 11. The inlet blower further include an exhaust conduit 55 which is connected to a lower air supply passage 57 formed by an inner lower wall 58 and the bottom wall 26 of the housing. The inner lower wall includes a continuous substantially upright portion 59 disposed in spaced substantially parallel relation to the front wall 27 of the housing. The upright portion 59 and the front wall 27 include angularly inwardly directed upper wall portions 61 and 62, respectively, which are disposed in somewhat converging relation to form an elongated air discharge slot or orifice 65 in spaced facing relation to the exhaust hood 30. It will be apparent that air under pressure from the inlet blower 53 is discharged through the orifice 65 in a stream at an appreciable velocity across the cooking surface 12 in the direction of the arrows 66 and into the hood 30.

An elongated tubular manifold 70 is disposed within the air discharge orifice 65 of the housing and provides opposite ends 72 individually secured to elongated substantially rectangular mounting flanges 73. An elongated slot 74 is formed through each of the flanges individually to receive a mounting bolt and nut assembly 75 for mounting the flanges on their adjacent side walls 28 of the housing. Accordingly, prior to tightening the nuts, the flanges are slidable on the bolts adjustably to dispose the manifold in various positions relative to the air discharge orifice. A plurality of individual spray nozzles 77 are mounted in equally spaced relation along the manifold for supplying a spray of water droplets into the airstream above the grill 11. The manifold is connected to a source of water under pressure for discharge through the nozzles at substantially the same velocity as the air through the air discharge orifice.

Operation

The operation of the described embodiment of the subject invention is believed to be clearly apparent and is briefly summarized at this point. As previously described, the cooking range is adapted to be located in a building such as a restaurant or the like wherein the temperature of the surrounding atmosphere within the room in which the range is located is maintained at a predetermined comfortable level. The inlet air opening 46 is connected by a suitable conduit, not shown, to a source of fresh air usually externally of the room. The exhaust tube 43 of the blower 40 is also preferably extended, by a suitable conduit, outwardly of the room in which the cooking unit is located and remotely from the conduit connected to the fresh air inlet opening 46. During cooking of the food 16 on the cooking surface 12 of the grill, or whenever the burner 18 is in operation, the blowers 40 and 53 are activated by energizing their respective electric drive motors, not shown. During operation of the blowers, fresh air is drawn inwardly of the housing through the inlet passage 45 and through the lower air supply passage 57 for discharge through the elongated orifice 65.

The airstream, indicated by the arrows 66, discharged through the orifice 65 provides a substantially solid air curtain inclined angularly upwardly toward the exhaust hood 30. The exhaust blower 40 creates a low pressure within the exhaust passage 38 to draw the air curtain upwardly therethrough for discharge through the exhaust tube 43. Accordingly, the fumes and other contaminants which emanate from the cooking surface are picked up by the airstream and dependably removed from the localized zone 22.

As previously described, the air curtain over the cooking surface 12 while effective to entrain cooking fumes and other contaminants, is not itself effective to block the radiant heat from the cooking surface. Consequently, the manifold 70 is supplied with water under pressure which is dispersed into the airstream in a spray of water droplets at substantially the same velocity as the airstream from the orifice 65. The nozzles 77 are of a predetermined size and type so that the airstream is substantially filled with the droplets in a visible fog. Many suitable nozzles are available and are generally referred to as fog nozzles. The droplets present a movable barrier which reflects radiant heat and minimizes its passage from the cooking surface into the room.

As the droplets pass over the cooking surface 12, they absorb a substantial amount of heat energy until vaporization occurs which further enhances the contaminant absorbing ability of the air curtain. During such vaporization, the velocity of the water spray or fog accelerated by the low pressure in the exhaust hood 30 so that a minimum of contaminants entrained therein is dropped back onto the cooking surface. It is noted that the size of the droplets is such so as not completely to vaporize until reaching the exhaust hood 30 or closely approaching it where the contaminants in the airstream are subjected to the low pressure created within the hood 30 and exhaust passage 38 by the exhaust blower 40.

Furthermore, during vaporization of the droplets, the amount of heat absorbed by the water droplets in converting to water vapor produces a refrigerating effect on the air curtain which minimizes passage of heat through the air curtain into the surrounding atmosphere. In view of the velocity of the air curtain and water droplets, the surrounding atmosphere within the room in which the cooking range is located is not displaced or adversely affected by the operation of the grill. Therefore, the present invention provides substantial improvement over the previously described air recirculating ventilation systems which withdraw and utilize conditioned air from the room in which the cooking range is located. On the other hand, the apparatus and method of the present invention provides a non-recirculating system which utilizes a continuous supply of fresh air from the outside and which effectively precludes the transfer of contaminants and heat from the grill into the surrounding atmosphere of the room. Furthermore, the present invention not only is effective to absorb and to remove such contaminants but by introduction of the water droplets into the air curtain provides an effective shield against the passage of radiant heat through the air curtain.

Although the invention has been herein shown and described in what is conceived to be the most practical and preferred method and apparatus, it is recognized that departures may be made therefrom within the scope of the invention, which is not to be limited to the details disclosed herein but is to be accorded the full scope of the claims so as to embrace any and all equivalent methods and apparatus.

Having described my invention, what I claim as new and desire to secure by Letters Patent is:

1. In a system for confining heat to a localized area having air supply means providing a discharge orifice for directing a curtain of air in shielding relation to such an area, and air exhaust means spaced from said orifice in outwardly extended relation from said localized area; the improvement comprising water discharge means adapted to introduce water in the form of droplets into said airstream and provide therewith a barrier which reflects radiant heat back into said localized area.

2. A system for removing airborne contaminants from a heat producing area of contamination, said system having air supply means providing a discharge orifice for directing a curtain of air in shielding relation to the area of contamination to pick up contaminants and convectional heat currents emanating therefrom, and air exhaust means spaced from the orifice and extended from the area of contamination to receive said airstream, nozzle means mounted within said air discharge orifice for dispersing a plurality of water droplets into the airstream to produce an uninterrupted shroud of fog which serves as a reflective and heat absorbing fog barrier against the transfer of convectional and radiant heat from the area of contamination outwardly through the airstream.

3. In a system for removing airborne contaminants such as the products of combustion and volatilization incident to cooking from a cooking or other heat producing area of contamination having air supply means providing a discharge orifice for directing a curtain of air in shielding relation to the area of contamination to pick up contaminants and convectional heat currents emanating therefrom, and air exhaust means spaced from the orifice and extended from the area of contamination to receive said airstream; the improvement comprising nozzle means mounted within said air discharge orifice for dispersing a plurality of water droplets into the airstream to produce a reflective and heat absorbing fog barrier against the transfer of convectional and radiant heat from the area of contamination outwardly through the airstream, said nozzle means being adjustable toward and away from said area of contamination so as to regulate the size of droplets in said fog barrier in corresponding relation to the intensity of said heat emanating from the area of contamination.

4. In a system for confining heat to a localized area having air supply means providing a discharge orifice for directing a curtain of air in shielding relation to such an area, and air exhaust means spaced from said orifice in outwardly extended relation from said localized area; the improvement comprising water discharge means adapted to introduce water droplets into said airstream adjacent to said localized area to reflect from and to absorb heat into the airstream, said water discharge means including an elongated manifold adapted to be connected to a source of water under pressure, and a plurality of nozzles mounted in spaced relation on the manifold individually providing constricted water discharge openings from the manifold to produce an elongated uninterrupted shroud of fog of such water droplets within said air curtain over the area of contamination.

5. The system as defined in claim 4 in which said droplets and said airstream are discharged in the same direction and at approximately the same velocity for simultaneous movement over the area of contamination.

6. A method of confining convectional and radiant heat to a localized area comprising directing a traveling curtain of air from an elongated orifice adjacent to said localized area, and introducing into said curtain of air water droplets of a sufficient size and volume to produce an uninterrupted shroud of fog serving as a reflective barrier against the passage of said heat through said air curtain.

7. The method of claim 6 including absorbing said heat into the water droplets, vaporizing said droplets to cool the air within said air curtain, accelerating the velocity of movement of said vaporized droplets at a point spaced from said air discharge orifice, and directing said airstream and said vaporized droplets outwardly from said localized area.

References Cited

UNITED STATES PATENTS

| 2,544,769 | 3/1961 | Sperry et al. | 98—115 |
| 2,954,968 | 10/1960 | Vedder | 263—50 |
| 3,069,091 | 12/1962 | Giesse et al. | 239—424 X |

ROBERT A. O'LEARY, *Primary Examiner.*

W. E. WAYNER, *Assistant Examiner.*